No. 671,392. Patented Apr. 2, 1901.
J. R. BROWN.
CAN FILLING MACHINE.
(Application filed Apr. 21, 1900.)
(No Model.) 6 Sheets—Sheet 1.

WITNESSES:
A. E. Dieterich
Louis Dieterich

INVENTOR
John R. Brown
BY
Fred G. Dieterich
ATTORNEY

THE NORRIS PETERS CO., PHOTO-LITHO., WASHINGTON, D. C.

No. 671,392. Patented Apr. 2, 1901.
J. R. BROWN.
CAN FILLING MACHINE.
(Application filed Apr. 21, 1900.)
(No Model.) 6 Sheets—Sheet 2.

Fig. 2.

WITNESSES: INVENTOR
A. E. Dieterich John R. Brown
Louis Dieterich BY
Fred G. Dieterich
ATTORNEY

No. 671,392. Patented Apr. 2, 1901.
J. R. BROWN.
CAN FILLING MACHINE.
(Application filed Apr. 21, 1900.)

(No Model.) 6 Sheets—Sheet 5.

WITNESSES:
A. E. Dieterich
Louis Dieterich

INVENTOR
John R. Brown
BY
Fred G. Dieterich
ATTORNEY

UNITED STATES PATENT OFFICE.

JOHN REITTER BROWN, OF VANCOUVER, CANADA.

CAN-FILLING MACHINE.

SPECIFICATION forming part of Letters Patent No. 671,392, dated April 2, 1901.

Application filed April 21, 1900. Serial No. 13,785. (No model.)

*To all whom it may concern:*

Be it known that I, JOHN REITTER BROWN, a citizen of the Dominion of Canada, residing at Vancouver, in the Province of British Columbia, Canada, have invented a new and useful Can-Filling Machine, of which the following is a specification.

My invention relates to improvements in machines for filling raw fish or other like material into cans; and its objects are, first, to press the fish into cylindrical form, with the skins on the outside, of a size to enter the cans to be filled and to move such cylindrical bodies of fish downward at regular intervals into each chamber in a revolving cylinder beneath the forming-tube; second, to cause reciprocating knives to move forward, cutting off the fish while the revolver is at rest and then moving the revolver, so that another chamber therein is brought beneath the forming-tube, while the knives are pressed forward, acting as a bottom for same, and, third, to move a can beneath the filled chamber in the revolver, press it up with its open mouth in close proximity to the same, and then press the fish down into the can, lower same, and withdraw the plunger and remove the filled can. While the revolver is at rest and this latter operation is being performed, another downward movement of the fish is taking place and the knives are opened and closed, so that another charge is ready in one of the chambers in the revolver for the next can.

A further object is to cut off each section of fish of a length a little less than the depth of the cans, so that any bony substance in the fish will not prevent the plunger setting the upper surface of the fish below the upper rim of the can in order that the cover will go on properly, and also to provide for the escapement of air from the can as the fish is pushed therein.

Other advantages will be seen when this specification and the appended claims are fully understood.

I attain the above objects by the mechanism illustrated in the accompanying drawings, in which—

Fig. 1ª is a diagram showing the relative positions of the driving-crank during certain operations of the other members of the machine.

Similar characters refer to similar parts throughout the several views.

The table 10 and 10ª, with its legs 11, constitutes the framework of the machine, the portion of the table 10 being at a plane above the portion 10ª for a reason to be seen presently.

Suitably journaled in bearings on standards 12, which are secured to the table 10, is a fluted forming-wheel 13.

Figure 4:
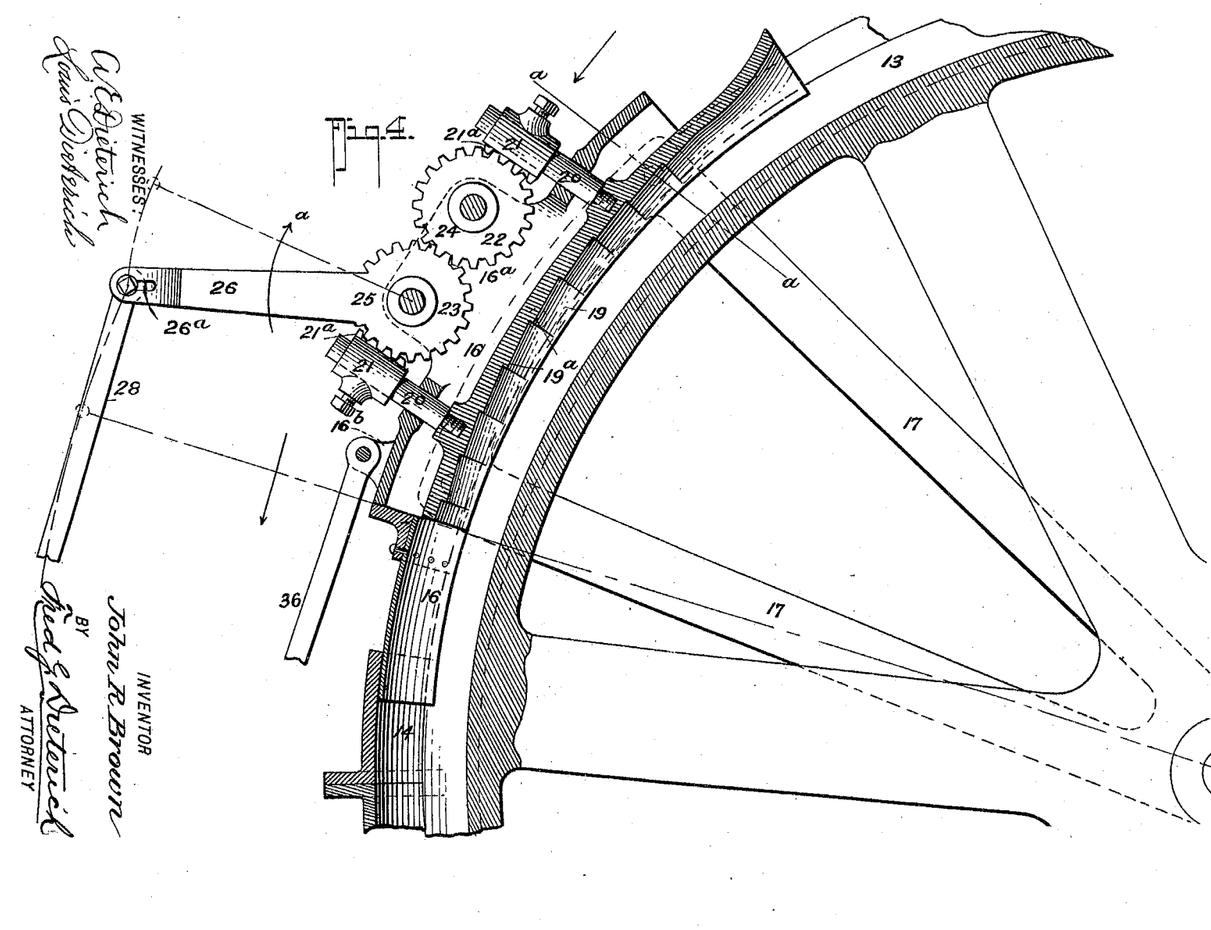
Fig. 4 is an enlarged sectional detail of the mechanism which grips the fish or other material being filled into cans and moves it downward at intervals as each chamber is brought beneath the same.
Figures 5, 7:
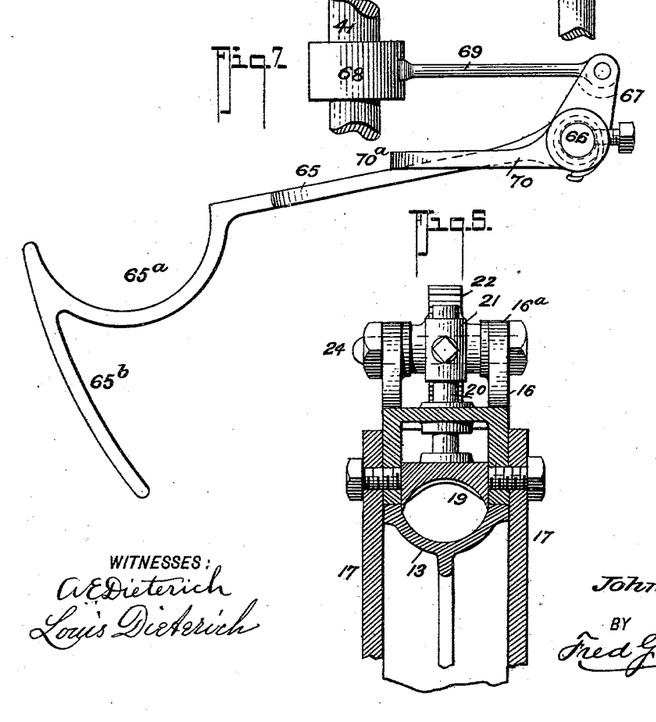
Fig. 5 is a cross-section through the grip and forming-wheel, taken on the line *a a* in Fig. 4.
Fig. 7 is another view of the same, showing the said lever in plan.

Arranged on the inner side of the forming-wheel 13 in a vertical position and tangent to such wheel is a spout 14, which is bolted to the table 10, and its upper end is stayed by rods 15, connecting it with the outer sides of the standards 12. Continuing upward from the spout 14, but with its lower end in the mouth thereof, is a segment of a spout 16, which continues for a distance around the wheel 13, forming a continuation of the fixed tube 14. This segment of tube 16 is fixed to and supported on arms 17, which radiate from and are loosely pivoted on the axle of the wheel 13 and are counterbalanced by weights 18, arranged on the continued projecting ends thereof, as 17ª. (See Fig. 1.) As better shown in Figs. 4 and 5, this segment of a spout 16 is susceptible of being moved for a distance around in a downward direction, the lower end moving in the fixed spout 14; but before such downward movement takes place the spout formed by the segment 16 and the fluted wheel 13 is contracted to securely grip the fish or other material, and when the downward stroke takes place the grip is released. This novel and ingenious action is attained by the construction and operation of the following mechanism: The contractible portion or grip of the segment 16, as 19, is provided with fixed studs 20, arranged at a suitable distance apart. These studs 20 pass through apertures in the outer shell of the portion 16, and near their outer ends are secured collars 21, having on their inner sides racks 21ª, which mesh with toothed wheels 22 and 23, mounted on pins 24 and 25, respectively, which pins are fixed through oppositely-projecting lips 16ª on the segment 16. Integral with and projecting upward from the wheel 23 is a lever 26, and communicating between this lever and a pin 27 on the crank 29 is a rod 28. The said crank 29 is securely fixed to the end of a shaft 30. Continuous movement is imparted to the shaft 30 by a belt 32, taking around a pulley 33, fixed thereon. As the shaft 30 is rotated and the rod 28 moved back and forth the lever 26 will, by reason of the toothed wheels 22 and 23 engaging each other, cause the grip 19 to move in and out just before a downward stroke and immediately after the same will cause the segment 16 to reach forward and draw the material downward, and with each movement the wheel 13 is carried around the distance of the stroke taken by the segment 16, which practically forms a contractible moving curved forming-spout coinciding with the alinement of the tangentially-placed fixed spout 14. (See Figs. 1 and 2.)

When it is understood that a fresh fish and material of that class is extremely slippery, the advantages of a mechanism such as I have just described will be appreciated, and to further insure that the material will be pulled down at each stroke I provide teeth 19ª on the grip, which take a firm hold as each downward movement is produced.

Arranged to turn on a vertically-placed spindle 34, which is rigidly fixed on the table 10ª, is a revolver 35, having chambers 35ª therein at regular intervals, arranged in a concentric circle a suitable distance from its outer periphery. As this revolver 35 is moved around upon its spindle the chambers 35ª are each brought in alinement beneath the lower end of the fixed spout 14, and this movement is performed at regular intervals by an arm 36, pivoted to the depending end of a bell-crank lever 36ª, pivoted to a lug 10ᵇ on the table 10ª, and the opposite end of the lever 36ª is connected to a lug 16ᵇ on the segment 16 by a rod 36ᵇ.

At each downward movement of the fluted segment 16 the arm 36 is moved forward, in the end of which is a swiveled pawl 37, which slides forward and engages notches 38 in a groove 39 on the under side of the revolver 35, which groove is placed concentric to the axis of the revolver.

For each rotation of the shaft 30 the segment of the tube 16 is pushed up and pulled down, and the revolver 35 is moved a distance to correspond with the distance between each of the chambers 35ª therein, and the rest position brings each chamber beneath the spout 14. It is now necessary to lock the revolver in such position while a further operation takes place, the mechanism for the same being subject to other movements, which will be described presently.

Figure 3:
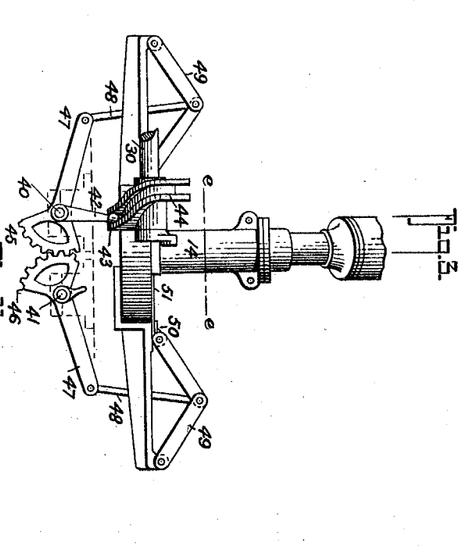
Fig. 3 is a detail of the knife-actuating mechanism, showing also the lever of the same gear which moves the lock-bolt and can-lift.

Suitably supported in bearings 10ᶜ beneath the table 10ª and placed parallel to each other and at right angles to the shaft 30 and passing on opposite sides and equidistant from and below the spindle 34 are rock-shafts 40 and 41. (See Figs. 1, 2, 3, and 9.) Secured to the outer end of the shaft 40, beneath the shaft 30, is a lever 42, having on its end an antifriction-roller 43, taking in a groove in a cam-wheel 44, which is fixed on the shaft 30, and the rock-shaft 40 communicates movement to the rock-shaft 41 by segmental gears 45 and 46, engaging each other and securely fulcrumed on the inner ends of the shafts 40 and 41, respectively. The outer extending ends of these segmental gears terminate in levers 47, which are connected by links 48 to toggles 49, the outer links of which are pivoted to laterally-extended portions of the table 10, and the inner links are pivoted to brackets 50, integral with knives 51, designed to slide between the lower end of the spout 14 and the chambers 35ª in the revolver 35. (See Figs. 3, 11, and 12.) These knives 51 are composed of flat steel blades having their edges of V-shaped form and bevel-sharpened from above and below in shear fashion, and they are held from lateral movement by depending portions of the spout 14, as 14ª and 14ᵇ, the portion 14ᵇ being secured to the table 10.

Beneath the web carrying the chambers 35ª in the revolver 35 is a web 35ᵇ, having thereon, directly beneath such chambers, bosses with apertures therein, in each of which is carried a spindle 52, integral with a can-supporting disk 52ª, and this spindle 52 is prevented from turning by a pin 53, passing through a flattened portion on one side of the spindle and an aperture in the boss of the web 35ᵇ, which allows the same to be raised and lowered, the object of which will be seen presently. A recess 35ᶜ is provided on the lower outer side of each of the said bosses, designed to receive a slidable bolt 54, which is mounted in an angled aperture 10$^d$ through a portion 10$^e$ on the table 10$^a$. (See Fig. 9.)

Suitably fixed to the rock-shaft 41 and projecting upwardly therefrom is a small lever 55, designed to engage a recess in the bolt 54. This as the shaft 41 is rocked back and forth pushes the bolt 54 in and out of the recess 35$^c$ in the outer side of the boss in the web 35$^b$, and by reason of the upper side of the said bolt being beveled off to correspond with a bevel on the end of the spindle 52 said spindles will be pushed up and allowed to lower with each inward and outward movement of the bolt, respectively.

From the foregoing it is obvious that for each revolution of the shaft 30, and consequently the cam 44, the shafts 40 and 41 will be rocked outwardly, which will drive the knives 51 forward and cut off the material that has been forced into one of the chambers 35$^a$ by the downward movement of the segment 16, before mentioned, and while the knives are thus pressed forward, forming a temporary bottom for the spout 14, the segment 16 is being moved up for a second bite of material and the rod 36 is pulled forward, drawing the revolver around and placing another chamber beneath the spout, said rocking movement of the shaft 41 having withdrawn the locking-bolt 54, and thus allowing the filled chamber 35$^a$ to be moved thereover.

Figures 8, 9:
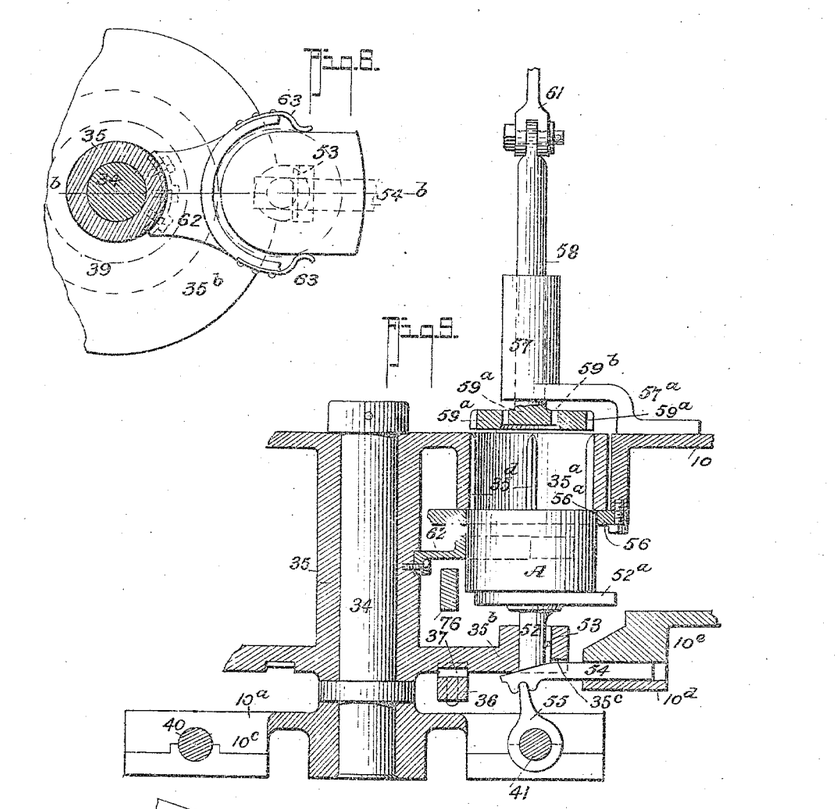
Fig. 8 is an enlarged detail plan of one of the can-guards located on the revolver, one of which is arranged below each chamber 35ª therein.
Fig. 9 is a vertical section through one of the chambers in the revolver, showing the plunger above and the can-lift and locking-bolt for the revolver beneath. This figure is on the line *b b* in Fig. 8.
Figure 10:
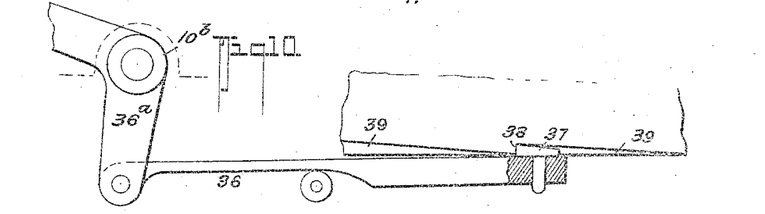
Fig. 10 is an enlarged detail of the pawl mechanism for rotating the revolver.
Figure 11:
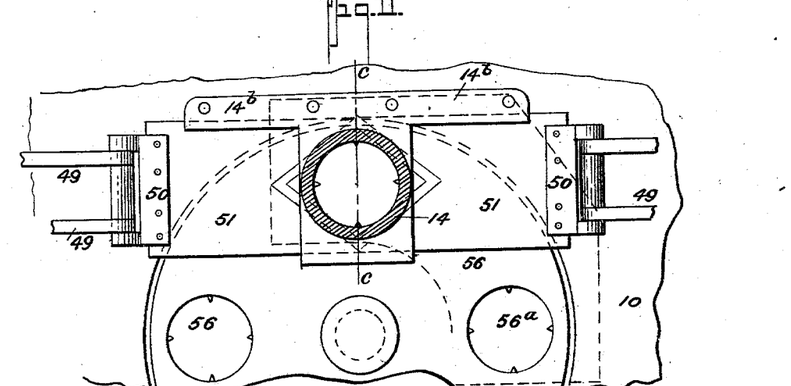
Fig. 11 is an enlarged plan section of the spout 14 on the line *e e* in Fig. 3, showing the arrangement of the knives.
Figure 12:
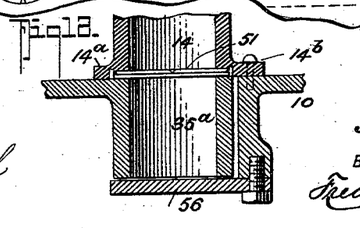
Fig. 12 is a section of the said spout and one of the chambers 35ª in the revolver, taken on line *c c* in the last figure.

As better shown by dotted lines in Fig. 11 and in section in Figs. 9 and 12, the lower openings of the chambers 35$^a$ are stopped by a plate 56, secured to a depending portion of the plate 10, while they rest beneath the spout 14; but at the next point of rest, as in Fig. 11, an aperture 56$^a$ is provided for the introduction of the material to the can A, while it is held up therein by the bolt 54.

Suitably arranged to move vertically through a boss 57, directly over the upper surface of the revolver and in vertical alinement with the opening 56$^a$ and secured to the table 10 by a bracket 57$^a$, is a stem 58, having thereon a plunger 59, designed to transfer or force the fish or other material from each chamber 35$^a$ to a can held in the opening 56$^a$, (see Fig. 9,) and communicating between an arm 60, integral with the movable segment 16 and the stem 58, is a rod 61, which at each downward stroke of the segment 16, carrying the grip, the material is forced from the chamber 35$^a$, that has just been filled, and another chamber is charged and cut off, as before intimated.

To better provide for the escapement of air when the fish is pushed therein by the plunger 59, vertical ribs 35$^d$ are arranged around the chamber, leaving artificial grooves in the material pushed into the can, through which the air may pass without blowing the material out and necessarily causing a slower movement of the plunger. The peripheries of the said plunger are provided with grooves 59$^a$ for the reception of the ribs 35$^d$, and to allow the air to flow to the under side of the plunger 59 above the material and avoid the danger of said material being sucked up again on the withdrawal of said plunger I provide an annular groove around the lower surface of the plunger, which is communicated with from the upper surface by apertures 59$^b$.

Secured to the hub of the revolver, between the web having the chambers 35$^a$ therein and the web 35$^b$, are arms or can-guards 62, which encircle the inner periphery of a can, and on the opposite projecting sides of these can-guards are resilient springs 63, designed to hold a can in its proper position while being carried around and filled. Each can-guard of course supports a can with its bottom resting on a disk 52$^a$. (See Fig. 8.)

65 indicates an arm mounted on a vertical rock-shaft 66, which is journaled in and passed through the table 10$^a$. This arm consists of a bar loosely mounted on said shaft 66, having a recess 65$^a$, in which the cans lie when being pressed forward, and a guard-arm 65$^b$, bent backward, forming a part of an arc at an even radius from its point of pivot, which prevents the cans from coming forward when in the position shown in Fig. 2.

Figure 6:
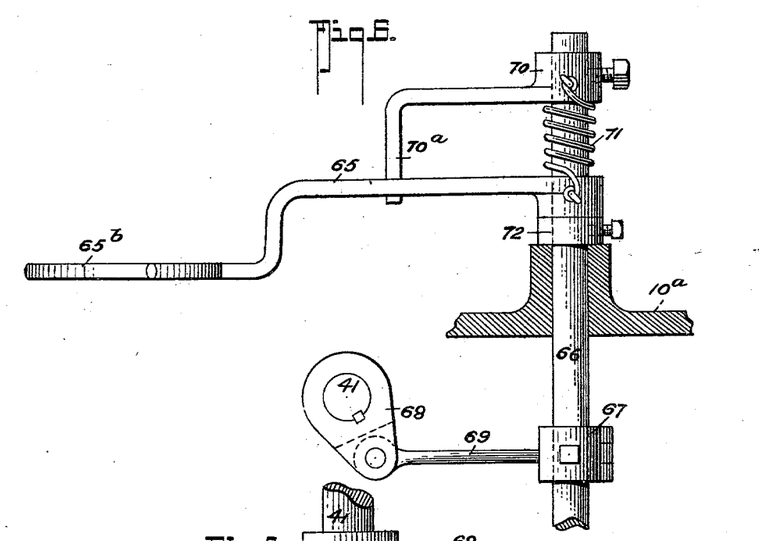
Fig. 6 is an enlarged detail of the mechanism by which the can-feed lever is actuated.

Secured to the depending end of the shaft 66 is a short lever 67, and this has communication with a like lever 68 on the rock-shaft 41 by a rod 69. (See Figs. 6 and 7.) Resiliency is imparted to the arm 65 by means of an arm 70, rigidly fixed to the upper end of said rock-shaft 66, having a depending arm 70$^a$, lying against the arm 65, and a coil-spring 71, wound around said shaft and connecting the bosses of the said arms together. A collar 72 is secured to the rock-shaft 66 beneath the boss of the arm 65, and this rests on the table 10$^a$, and thus provides a suitable support for the said feeding device.

From the foregoing it is shown that as the shafts 40 and 41 rock inwardly the arm 65 will move out and allow another can to take its place in the recess 65$^a$ and then moves forward, pushing the can between the springs 63 in the guard 62, when the revolver moves to a second position. While the arm 65 is drawn back for the reception of another can, as just described, such can is prevented from being carried beyond the recess 65$^a$ by a stop 73, secured on the table and passed over the feeding-band. (See Fig. 2.)

Figures 1, 2:
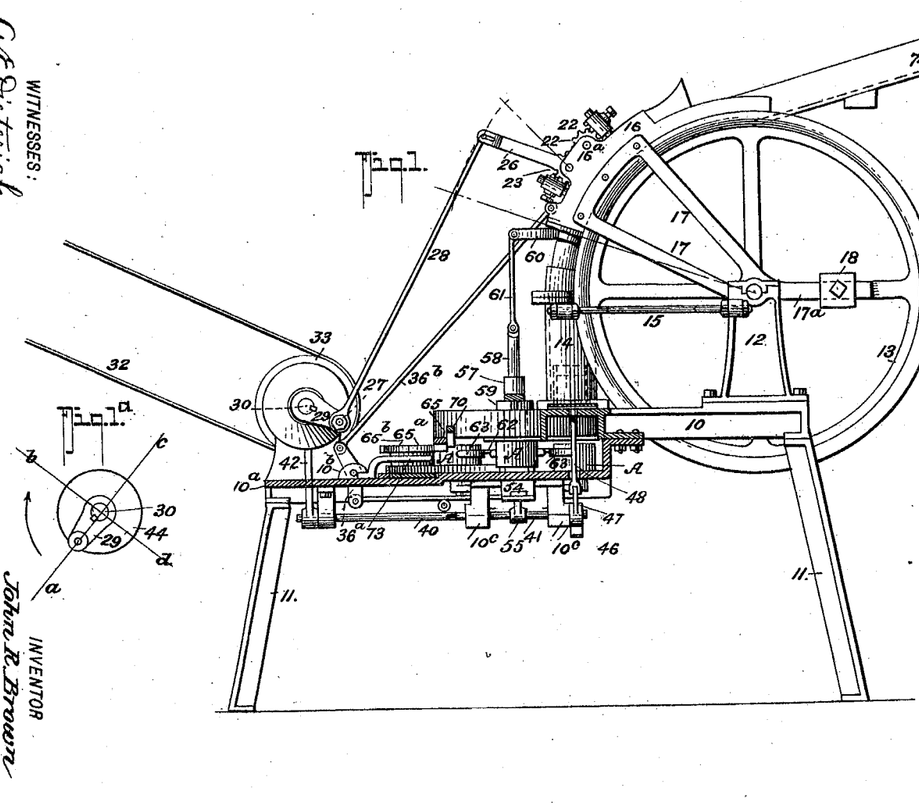
Figure 1 is a side sectional elevation of my machine, taken on the line *d d* in Fig. 2.
Fig. 2 is a plan of the machine.
Figure 2:
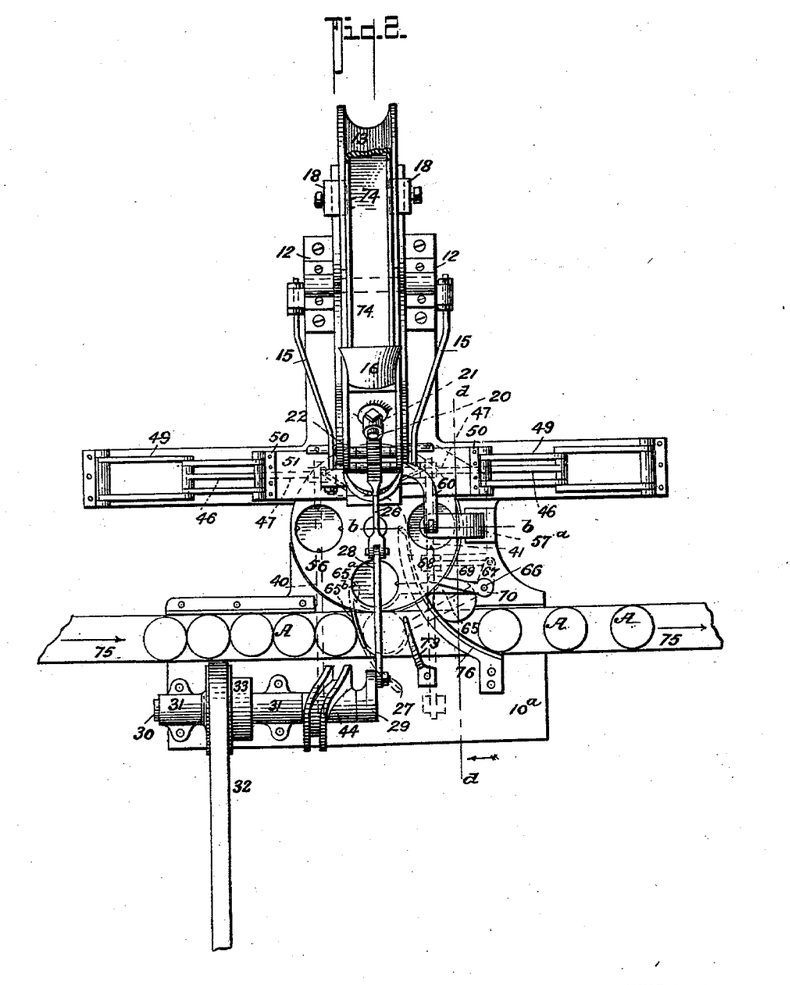

In the practical operation of my invention when fish is being filled into cans the same is cut in strips and placed in a convenient chute 74, with their skins outward, above the fluted wheel 13, whence it slides into the curved spout formed by said wheel and the grip 19 in the movable segment 16. The cans A are placed upon the band 75, from which the cans pass to the supporting devices, as shown in Fig. 2; but the said cans do not immediately pass under the spout 14. The said band 75 moves over the table 10$^a$ in the direction of the arrow, and the machine is set in motion by the means before described. At each revolution of the shaft 30 the segment 16, carrying the grip, will move up and down, carrying an amount of material downward into the spout 14 in proportion to the length of the lever 26 and the crank 29. While such downstroke takes place, the revolver is at rest, locked with a chamber 35ª beneath the spout 14 and another chamber beneath the plunger 59. This charges another chamber and pushes the charge in the chamber under the plunger into a can beneath. Then while the plunger is down the knives close by the action of the cam on the levers 47, cutting off the material. The locking-bolt withdraws, the filled can drops, and the can-feed arm withdraws to receive another can. The grip and compressor now ascend, and the pawl 37 on the end of the arm 36 moves the revolver to another position. Before such movement of the revolver takes place, however, the plunger has withdrawn from the chamber 35. The knives are now withdrawn, the bolt 54 locks the revolver and elevates another can to be filled, and a can is moved forward into one of the guards 62 by the arm 65, and the filled can is transferred back to the band 75 by a fixed guide 76, secured on the table and extending over the band 75 to the inner side of the track of the cans while in the revolver. (See Figs. 2 and 9.)

The foregoing relative movements take place when the crank 29 on the shaft 30 is moving in the following positions, (shown in Fig. 1ª:) As the crank moves between the points $a$ and $b$ the knives close and cut off the material, the bolt 54 withdraws, the can drops, and the can-feeding arm 65 moves back to dotted position (shown in Fig. 2) to receive another can. As the next approximate quarter of a circle is covered ($b$ to $c$) the segment 16, carrying grip 19, ascends, the plunger ascends, and the revolver is turned by the pawl 37 on the arm 36. During the movement from $c$ to $d$ the knives withdraw by the inward turn of the shafts 40 and 41, actuated by the cam 44, the bolt 54 locks the revolver, and the can lifts, and a can is pushed into place between the springs 63 in the guard 62, and during the movement of crank from $d$ to $a$ the segment 16 and plunger 59 descend, and the pawl 37 is pushed forward to engage another notch in the revolver.

By reason of a slot 26ª in the end of the lever 26 the rod 28, that operates the segment 16, may be set at the desired distance from such segment to give it the necessary movement up and down, and thereby regulate the amount of material fed to the spout 14 at each downward stroke, according to the depth of can being filled or the class of material being handled.

It is manifest to the student of this specification that as the fish is moved downward by the grip 19 it will be introduced into each of the chambers 35ª in cylindrical form with the skin outward, cut off by the knives, and introduced to the cans in this form in a clean and workmanlike manner, and, considering the many functions the machine is required to perform to attain the desired result, the mechanism is comparatively simple and is well designed to perform the work for which it is constructed.

Although I have in most respects detailed the particular construction of my invention, I do not wish to be understood as confining myself to such details, as modifications may be made in the hands of the manufacturer without departing from the spirit of the invention.

Having now described my invention, what I claim as new, and desire to be protected in by Letters Patent, is—

1. In a can-filling machine, a fluted wheel mounted on journals in a suitable frame; a spout 14 fixed vertically and tangent to the flute of said wheel; a fluted curved segment 16 having its lower reduced end in the upper mouth of the tube 14 designed to move in a circle in close proximity with the periphery of the said wheel; a grip 19 having teeth thereon within the segment; studs on such grip passing through the segment 16; collars having teeth on the inner sides thereof fixed to the studs; toothed wheels 22 and 23 mounted on pins in the segment 16 engaging the teeth in the collars, and a lever 26 integral with the wheel 23, and means for moving said lever up and down.

2. A fluted wheel 13 mounted on a suitable frame; a segment of a curved flute 16 pivoted by arms 17 on the axle of the wheel, and forming, with the flute of the wheel, a curved spout; a fixed spout 14 communicating with the spout formed by the wheel 13 and the segment 16; a grip within the segment 16, and a lever 26 by which the same is operated, and the segment together with wheel 13 is moved in a downward direction and the segment returned upward, in combination with a revolver 35 having chambers 35ª therein arranged to turn on a vertical spindle, means for bringing the chambers to rest position directly beneath the fixed spout 14, knives 51 of V-shaped form arranged to reciprocate between the spout 14 and the chamber 35ª when at rest beneath the said spout, substantially for the purposes set forth.

3. In a machine of the class described, a fluted wheel 13 mounted on suitable bearings; a fluted segment 16 secured to radial arms pivoted to the axle of the wheel 13, forming, with the flute of the wheel, a moving curved spout, and said segment being arranged to move the wheel forward for each downward movement thereof; a grip having teeth thereon within the segment 16 for taking a firm hold of the material, and a fixed spout 14 placed tangent with the flute of the wheel 13 and made to receive the lower end of the segment 16, substantially for the purposes specified.

4. In a machine for filling fish or other like material into cans, having a fluted wheel mounted in suitable bearings and a movable fluted segment forming, with the wheel a, a movable curved forming-spout; a fixed spout 14 connecting with the curved spout, and means for moving the curved spout downward at regular intervals, in combination with a revolver 35 having chambers 35ª designed to pass beneath the fixed spout; V-shaped knives designed to move on a horizontal plane between the spout 14 and a chamber in the revolver; vertical movable can-supporting disks 52ª carried by the revolver beneath the chambers therein, and can-guards 62 having springs 63 thereon between such disks and the chambers; of an arm 65 arranged to swing over a traveling band on the outer side of the revolver, designed to move a can into each of the guards 62; a swivel-pawl 37 on an arm 36 beneath the revolver designed to move it forward the distance between the chambers; a plunger over the rest position of one of the chambers in the revolver, which plunger is moved by the movement of the curved spout, a locking-bolt 54 beneath the revolver for holding same at rest while the curved spout moves down, the plunger moves down and until the knives are forced together, substantially as specified.

5. In combination with a fluted wheel 13 mounted to turn in suitable bearings, and a movable fluted segment 16 forming with the wheel, a curved spout which connects with a fixed spout 14, a revolver 35 arranged to turn on a vertically-placed spindle 34, fixed to a table 10ª, with its upper surface below the lower end of the spout 14, chambers 35ª at regular intervals in the upper surface of the revolver, and can-supporting disks beneath the chambers, V-shaped knives made to pass between the spout and the upper surface of the revolver, a plunger 59 poised over the track of the chambers at a distance from the spout 14 to correspond with the distance between the chambers 35ª in the revolver, a bell-crank 36ª pivoted on the said table, a rod 36ᵇ connecting the upper lever of the bell-crank with the movable segment 16, a pawl 37 connected with the lower lever of the said bell-crank, by an arm 36, said pawl contacting with notches in a groove in the lower end of the revolver and concentric therewith, rock-shafts 40 and 41 mounted beneath the table, a lever 42 secured to the forward end of the shaft 40 having its end in a groove in a cam 44 secured on a rotary shaft 30 mounted in suitable bearings above the table and at right angles to the shafts 40 and 41, segmental gears 45 and 46 engaging each other on the shafts 40 and 41, levers on the ends of such segmental gears, which open and close the knives when the shafts rock back and forth, a short lever 55 on the shaft 41, a slidable locking-bolt 54 engaging the end of said lever which locks the revolver 35 and elevates a can while at rest, and while the material is being pushed into a chamber 35ª and a can A, and releases said revolver and lowers a can prior to another forward movement of the rod 36 caused by the upward movement of the segment 16, substantially as and for the purposes set forth.

6. A revolver 35 mounted on a vertical spindle 34 fixed to a table 10ª, chambers 35ª at regular intervals in the upper end of said revolver, a spout 14 of a diameter to correspond with the size of said chambers, a plunger arranged above the path of the chambers a distance from the spout 14 to correspond with the distance between the chambers in the revolver, a fixed plate 56 beneath the spout 14 and the plunger at a plane below and in proximity to the chambers in the revolver, such plate extending around to beneath the plunger and designed to act as a bottom for the chambers at this point and a downwardly-flared opening 56ª in the said plate in perpendicular alinement with the plunger, vertical movable disks 52ª beneath the chambers and guards arranged between such disks and the chambers, means for moving the revolver so that its chambers are brought to rest beneath the spout 14 and the plunger, and for locking it there, and for forcing the material held in the spout 14 into the chamber beneath the same and for transferring the material from the chamber beneath the plunger to a can, and for cutting off the material that has been forced from the spout 14, substantially as set forth.

7. A revolver 35 arranged to turn over a table 10ª, having chambers in the upper end thereof, a fixed spout over the revolver, the chambers of such revolver being susceptible of being brought in alinement with the spout, V-shaped knives designed to reciprocate between the spout and the chambers in the revolver; rock-shafts 40 and 41 beneath the table 10ª; levers on said shafts; links connecting between the levers and toggles to which the knives are fixed; a slidable locking-bolt 54 above and at right angles to the shaft 41; a lever 55 on the shaft 41 engaging the inner end of the locking-bolt, and means for rocking the shafts to and from each other, whereby, by the outward movement of such shafts the knives close over the chamber at rest beneath the spout 14, forming a temporary bottom therefor and withdrawing the locking-bolt 54, substantially as specified.

8. In combination, a grooved wheel 13 mounted on suitable bearings, a fluted segment 16 made to lie over the flute of said wheel, forming with the flute of the wheel a curved spout, a grip within such spout, a fixed spout arranged vertically tangent to the flute of the wheel, and receiving the lower end of the fluted segment, a revolver beneath the fixed spout, a pawl-arm 36 beneath the revolver connecting with a bell-crank 36ª, a shaft 30 mounted in bearings on a suitable table, a crank 29 on the end of such shaft, rod-and-lever communications with the fluted segment 16 and a rod 36ᵇ connecting the upper end of the bell-crank to the said segment 16, whereby the grip within the segment 16 is opened and closed and the segment is drawn up and down as the shaft 30 is turned and the revolver is moved around at regular intervals, and means for locking such revolver with a chamber beneath the spout 14, substantially as specified.

9. In a can-filling machine, a revolver having chambers therein and can-supporting disks $52^a$ therebeneath and guards 62 between the chambers and the said disks; a pawl 37 on an arm 36 designed to slide in a groove beneath the revolver for turning same a specified distance; a slidable bolt 54 arranged to move beneath the stem of each can-supporting disk and to elevate the same, and a lever 55 fixed on a rock-shaft 41 engaging the forward end of the slidable bolt, substantially as and for the purposes specified.

10. In combination with a revolver 35 having fish-receiving chambers therein, and can-supporting disks beneath the chambers, a spout 14 fixed over the path of the chambers in the revolver and a contractible, movable, curved spout connecting with the spout 14, reciprocating knives between the spout 14 and the chambers in the revolver, which form, when the fish is cut off, a temporary bottom for the spout, and a plate rigidly fixed at this point in proximity beneath the chambers forming a bottom for such chambers at this point between where the fish is placed in the chamber and introduced to the can, substantially as set forth.

11. In a can-filling machine, a revolver 35 arranged to turn on a suitable table; chambers in such revolver and can-supporting disks beneath the chambers, a stem having a beveled end depending from each of the disks and passing through an aperture in a boss in the lower end web of the revolver; means for preventing the disk from being turned; a recess on each of the lower outer sides of the bosses through which the stems are passed, in combination with a slidable locking-bar 54 designed to be moved into the recess in each of the bosses through which the stems pass, locking the revolver and lifting the can, and a vertical, movable plunger 59 above the chamber brought to rest above the locking-bolt, substantially as specified.

12. In a machine for filling fish or other like material into cans, a fluted wheel 13 suitably mounted in bearings on a table 10; a fluted segment 16 mounted on arms pivoted on each side of the wheel, said fluted wheel, with the fluted segment, forming a grip for securely seizing and moving a column of fish forward into a spout 14 at intervals; a shaft 30 mounted in suitable bearings on a table $10^a$ at the opposite side of the machine from the wheel 13; a crank 29 on said shaft; a rod 28 connecting a lever 26 fixed to the said grip and with the said crank, and means for turning the shaft 30, substantially as and for the purposes set forth.

13. A shaft 30 mounted in bearings fixed on a table $10^a$; a grooved cam 44 secured on said shaft, shafts 40 and 41 mounted in suitable bearings beneath the said table and at right angles to the shaft 30; a lever 42 fixed on the shaft 40 having an antifriction-roller on the end thereof engaging the slot in the cam 44; segmental gears 45 and 46 meshing with each other and secured on the opposite ends of the shafts 40 and 41, in combination with reciprocating knives 51 designed to slide between a fixed spout and a movable chamber, and toggles, links and levers communicating between the said knives and the segmental gears, and means for rotating the shaft 30, substantially for the purposes specified.

14. In combination with a fluted wheel 13 and a fixed spout 14 placed tangent thereto; a movable segment 16 having its lower end within the spout 14 and mounted on arms 17 pivoted on the axle of the wheel 13 and radiating therefrom, a grip 19 having teeth thereon within the segment 16, and forming, with the fluted wheel, a continuation of the spout 14, means for causing the grip 19 to contract and expand the said spout, consisting of studs 20 on said grip passing through apertures in the segment 16, toothed collars fixed to the studs outside the segment 16, pinions 22 and 23 engaging each other and engaging the teeth on the collars, said pinions being mounted on pins 24 and 25, a lever 26 integral with the pinion 23 and means for moving the said lever up and down, substantially for the purposes specified.

15. In a can-filling machine, an arm 65 loosely mounted on a vertical rock-shaft 66 journaled in a table $10^a$, a fixed arm 70 secured to the top of said shaft, and a downwardly-curved portion $70^a$ on the end of said arm designed to lie against the arm 65, and a spiral spring coiled around the shaft 66 between said arms and fastened to the bosses thereof, in combination with a lever 67 secured to the shaft 66 beneath the table $10^a$ and a rod 69 connecting between the lever 67 and a like lever 68 fixed on a horizontal rock-shaft 41, substantially for the purposes specified.

16. In combination with a band 75 designed to convey cans over a table $10^a$, an arm 65 mounted on a vertical shaft 66 suitably journaled in said table, a revolver 35 having can-supporting disks thereon at regular intervals around its lower side, a pawl mechanism beneath the revolver for moving same around a distance to correspond with the distance between the can-supporting disks, a locking-bolt for holding the revolver at rest with a disk opposite a recess $65^a$ in the arm, and means for moving the arm forward while the revolver is at rest, and a backward-bent portion $65^b$ on the end of said arm, substantially as and for the purposes specified.

JOHN REITTER BROWN.

Witnesses:
ROWLAND BRITTAIN,
W. G. TRETHEWEY.